(12) United States Patent
Hingerling et al.

(10) Patent No.: US 7,804,051 B2
(45) Date of Patent: Sep. 28, 2010

(54) GEODETIC TARGET OBJECT AND SURVEYING SYSTEM WITH A STRUCTURAL INTEGRATION OF TRANSMITTING CHANNELS AND RECEIVING CHANNELS INTO A COMMON UNIT WITH A REFLECTOR COMPONENT

(75) Inventors: Jürg Hingerling, Marbach (CH); Klaus Schneider, Dornbim (AT)

(73) Assignee: Leica Geosystems AG, Heerbrugg (CH)

( * ) Notice: Subject to any disclaimer, the term of this patent is extended or adjusted under 35 U.S.C. 154(b) by 129 days.

(21) Appl. No.: 11/914,928

(22) PCT Filed: May 26, 2006

(86) PCT No.: PCT/EP2006/005039

§ 371 (c)(1),
(2), (4) Date: Nov. 19, 2007

(87) PCT Pub. No.: WO2006/133799

PCT Pub. Date: Dec. 21, 2006

(65) Prior Publication Data

US 2008/0229592 A1 Sep. 25, 2008

(30) Foreign Application Priority Data

Jun. 13, 2005 (EP) .................................. 05105165

(51) Int. Cl.
*G01C 21/02* (2006.01)
*H01J 3/14* (2006.01)
*G01C 15/02* (2006.01)

(52) U.S. Cl. ....................... 250/206.1; 250/216; 33/293

(58) Field of Classification Search ................. 250/216, 250/206.1, 206.2; 356/138, 139.1; 33/293
See application file for complete search history.

(56) References Cited

U.S. PATENT DOCUMENTS

| 4,814,628 | A | * | 3/1989 | Eichweber | 250/574 |
| 5,121,242 | A | * | 6/1992 | Kennedy | 398/170 |
| 5,416,321 | A | * | 5/1995 | Sebastian et al. | 250/288 |
| 6,014,220 | A | | 1/2000 | Kimura et al. | |
| 6,023,326 | A | | 2/2000 | Katayama et al. | |
| 6,133,998 | A | | 10/2000 | Monz et al. | |
| 6,185,055 | B1 | * | 2/2001 | Feist | 359/831 |
| 6,295,174 | B1 | | 9/2001 | Ishinabe et al. | |
| 2004/0113054 | A1 | * | 6/2004 | Majima et al. | 250/225 |

FOREIGN PATENT DOCUMENTS

| DE | 37 09 142 | 9/1988 |
| EP | 0 919 837 | 6/1999 |
| EP | 0 7016 288 | 6/1999 |
| EP | 1 176 429 | 1/2002 |

* cited by examiner

*Primary Examiner*—Thanh X Luu
(74) *Attorney, Agent, or Firm*—Workman Nydegger

(57) ABSTRACT

Disclosed is a geodetic target object comprising at least one reflector surface, a receive channel with a detector (18) for receiving electromagnetic radiation (ES) transmitted by a measuring unit (2"), and a transmit channel with a radiation source (13'). The associated transmission port and/or reception port is/are integrated into the reflector surface or is/are embodied so as to adjoin the reflector surface such that radiation (RS) that is modulated for transmitting data can be transmitted in the direction of the measuring unit (2") within the cross section (5") of the radiation (ES) generated by the measuring unit (2").

23 Claims, 6 Drawing Sheets

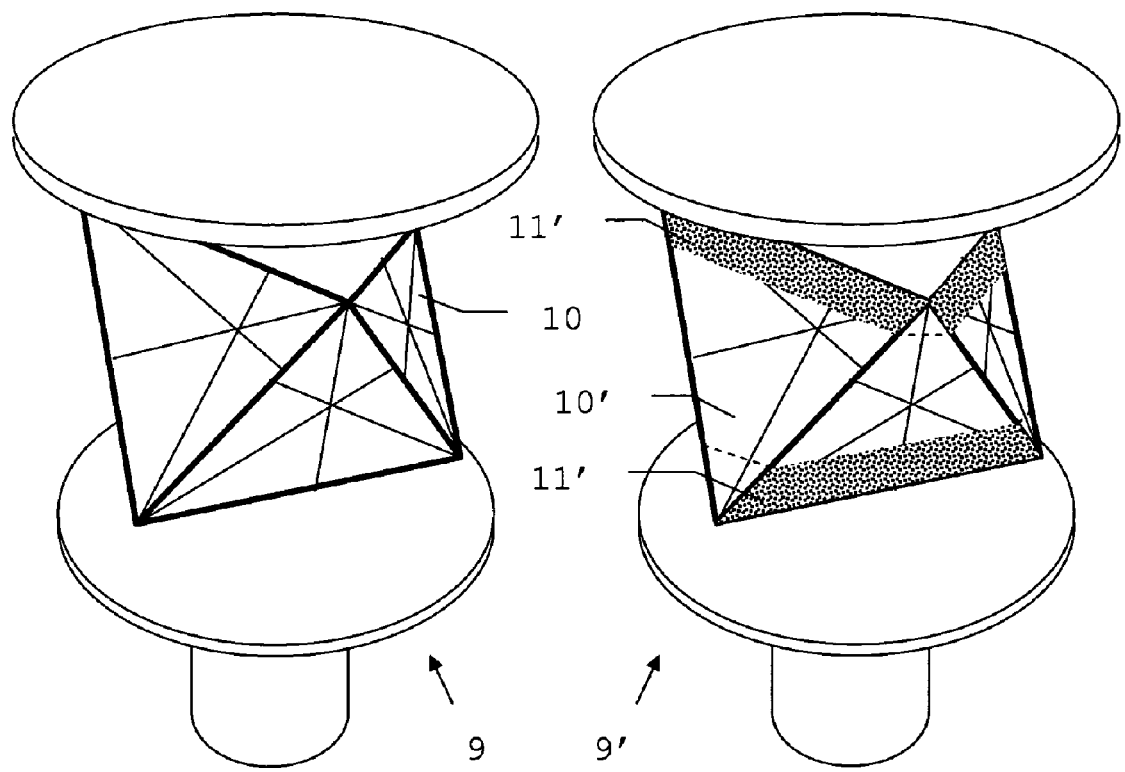
Fig. 3a  
PRIOR ART
Fig. 3b
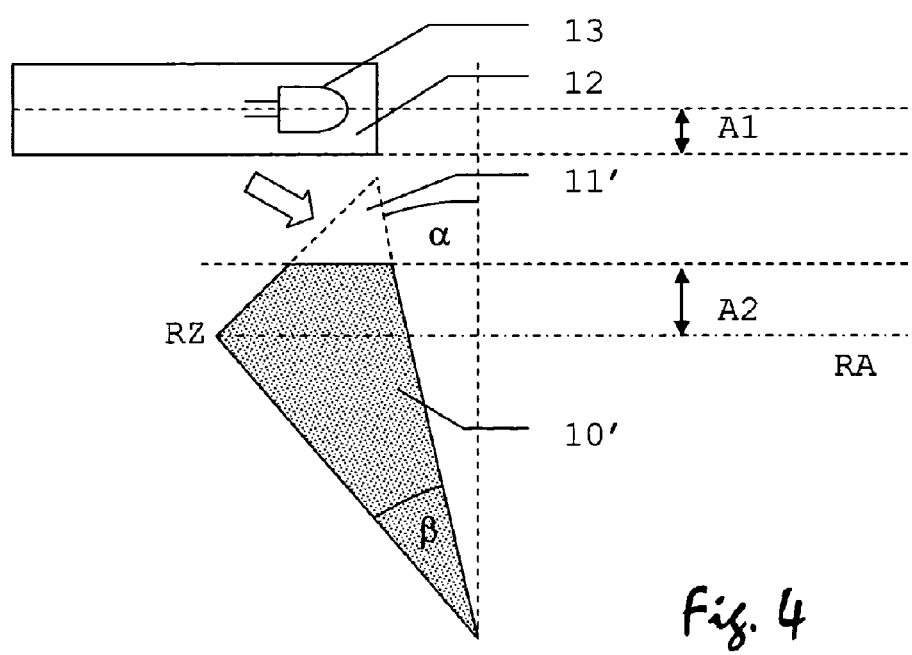
Fig. 4

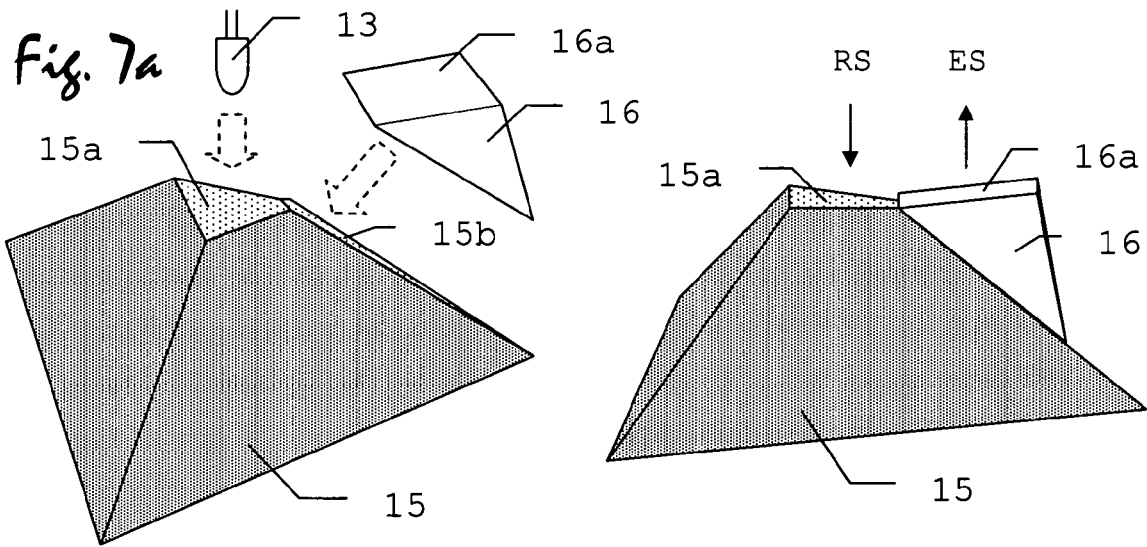
Fig. 7a
Fig. 7b
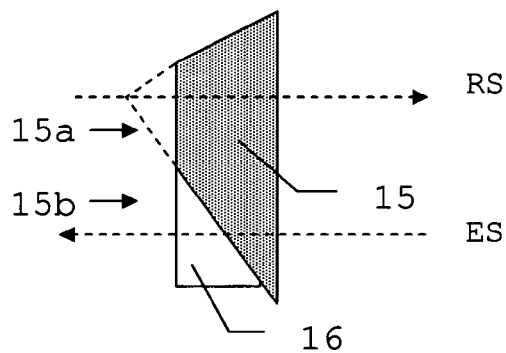
Fig. 7c
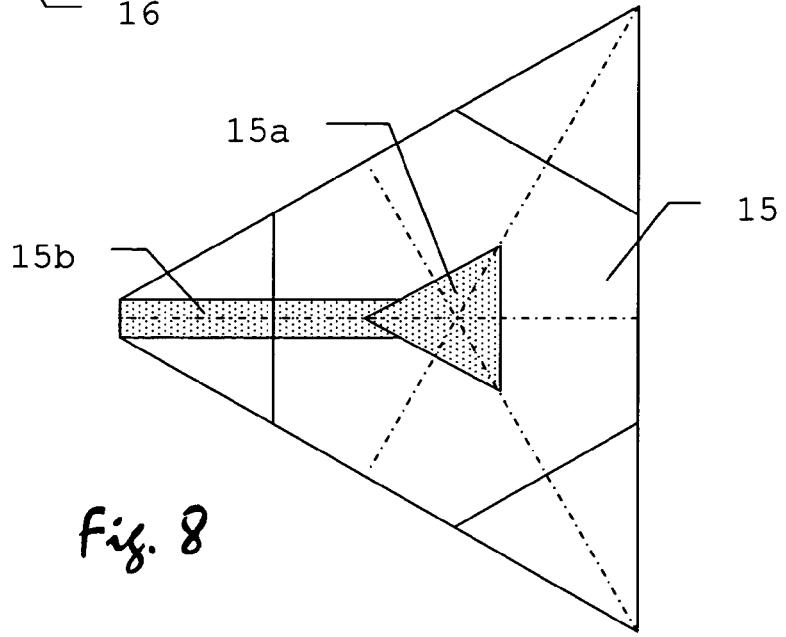
Fig. 8

GEODETIC TARGET OBJECT AND SURVEYING SYSTEM WITH A STRUCTURAL INTEGRATION OF TRANSMITTING CHANNELS AND RECEIVING CHANNELS INTO A COMMON UNIT WITH A REFLECTOR COMPONENT

The invention relates to a geodetic target object according to the pre-characterizing clause of Claim 1, a modular component for such a geodetic target object and a method for data transmission in geodetic measurements for determining the position of the geodetic target object.

In many geodetic applications, surveying of points is effected by placing specially designed target objects there. These generally consist of a plumb rod having a sightable mark or a reflector for definition of the measuring path or of the measuring point. Theodolites or total stations with distance and angle measurement functionality are generally used as central measuring units for surveying, it also being possible to survey a relatively large number of target objects by means of a central unit which necessitates the identification thereof. In such surveying tasks, a number of data, instructions, language and further pieces of information are transmitted between target object and central measuring unit for controlling the measuring process and for specifying or registering measured parameters. Examples of such data are the identification of the target object, inclination of the plumb rod, height of the reflector above the ground, detector constants or measured values, such as temperature or atmospheric pressure.

The electronic intelligence of the surveying system or the data processing capacity thereof are, however, almost always present in the central measuring unit. On the other hand, the target objects are as a rule passive objects not equipped with electronic intelligence. Current solutions for communication between target object and measuring unit are based on radio or wireless GSM. In addition, transmission often takes place through language, so that errors may arise through problems relating to understanding.

The prior art describes various approaches for integrating data transmission into the measuring process.

U.S. Pat. No. 6,133,998 discloses a method and an apparatus for target searching for geodetic devices. The scanning beam of the homing unit is detected by a receiver arranged close to the reflector and this acquisition is communicated via radio to the homing unit. In addition, owing to the size of the structure and its susceptibility to disturbance as a result of the parallel arrangement of reflector and receiver, in particular the use of a radio link is disadvantageous since greater technical complexity and less compactness result.

A prism apparatus comprising an additional receiving device for the optical transmission from a geodetic measuring device to the prism apparatus is described in U.S. Pat. No. 6,295,174. Radiation is coupled out from the region of the reflector by an optical path and transmitted to a receiving surface of the receiver arranged parallel to the axis. The receiving status is indicated by two LEDs which light up in different colours. Owing to the arrangement with two separate components and a fibre optic link, the design is complex, susceptible to disturbance and not very compact. In addition, data transmission takes place only in one direction and the reflectivity of the reflector is reduced by the attached link.

EP 0 716 288 describes a surveying device in which information about the deviation of the sighting unit from a required position is transmitted by a variable interruption of a laser beam emitted from the surveying device to the sighting unit. The laser is arranged parallel to the axis of the actual measuring laser and the beam is projected on to a receiver unit offset relative to the reflector. This arrangement, too, has little compactness and communication in only one direction.

The optical data transmission from a portable range finder to a sighting unit is disclosed in EP 1 176 429. This data transmission, too, takes place only in one direction. In addition the device is generically suitable only for short distances. Distance measurements and data transmissions over larger distances cannot be carried out, owing to the optical design and the poor directional stability.

U.S. Pat. No. 6,023,326 discloses a surveying system comprising a surveying device and a target object with data transmission in both directions. A reflector is arranged as a target object on a surveying staff, and an optical detector is arranged below and a signal light projection unit is arranged above, spatially separated in different components. The signal light projection unit produces modulated light which is emitted for precise spatial orientation in the direction of the surveying device and can also be used for transmitting control information. In addition, data transmission to the detector can take place from the surveying device. The design of the surveying staff with a plurality of morphologically separate components is, however, complex, susceptible to disturbance and not very compact. In addition all three components have a separate beam or receiving axis, these axes being arranged so as to be spatially separated one above the other and mutually non-collinear. For communication, two separate beam paths are used, which in turn require separate optical systems.

DE 37 09 142 A1 discloses an arrangement for transmitting laser light via an optical transmission path without further, in particular directed sensors. A retroreflector with remote corner and a separate radiation source as a reference light source are used on the receiver side. However, this is not used for communication but the detection of obstacles in the beam path or of soiling by back-scattering in the vicinity, in particular within the reflector or receiver, is effected. The radiation emitted by the reference light source is not modulated, so that it carries no information, which is also not intended. Moreover, only a unidirectional transmission path is described, in which only one outwardly guided and directed radiation channel is present at a time. The reference light path on the other hand is only internal and undirected, i.e. all optical beams are led within the transmitting arrangement or within the retroreflector.

EP 0 919 837 A2 describes a data communication apparatus for a theodolite comprising automatic target recognition (ATR). A beam is moved in a scanning motion by means of acousto-optical modulators in the object space. Here, the target or EDM measuring axis is not parallel to the tracking axis, the latter having an adjustable angle and being capable of being moved over a reflector unit. If the target or rangefinder axis is directed at the centre of a reflector unit, the tracking beam can be moved to any desired position on the target object. The light of this tracking beam is used for data communication since it is spatially addressable and thus reaches the receiver on the sighting unit. There is in principle therefore no need for the emission apparatus and the receiving apparatus to be positioned close together on the reflector. The prisms disclosed are round, with a broad edge region and without overlap with other components of the reflector, which is also not required in this approach. The distance-measuring beam is not used for communication. On the other hand, the problem of cross-coupling between distance measuring beam and the receiving apparatus on the reflector side is discussed. For this approach, there is therefore in principle no requirement for transmitting and receiving apertures to be close together.

The approaches of the prior art thus make use of morphologically separated components which are arranged a certain distance away from the optical axis of the reflector, which axis defines the geodetic measurement.

An object of the invention is the automation of the data exchange between target object and central measuring unit.

An object of the present invention is to provide a structurally integrated geodetic target object or a modular component for such an object, by means of which communication to a measuring unit can take place.

A further object of the invention is the reduction or avoidance of errors in the data transmission between target object and measuring unit.

A further object of the invention is the provision of a target object having transmitter and receiver axes located close together, so that the acquisition and communication in the measuring unit is possible with a common optical system or with two optical systems having parallel axes a small distance apart.

A further object is to simplify the handling of a system comprising target object and measuring unit during measurement.

These objects are achieved by the subjects of Claims 1, 15 and 16, respectively, or of the dependent claims or the solutions are further developed.

The invention is based on a structural integration of transmitting and receiving channels into a common unit with a reflector component, such as, for example, a retroreflector or more special forms such as triple or triangular prisms. This design permits the use of a transceiver as a transmitter/receiver combination in conjunction with a passive, optically acting retroreflector.

The reflectivity of the reflector should not be substantially reduced while at the same time the optical transmitted and receiving axes of the transceiver should be positioned as close as possible to the optical axis of the reflector, the axis being defined by the connecting line between central station and optical centre of the retroreflector.

For this purpose, the optical entry or exit surfaces of the transmitting and receiving channels are arranged so that their optical axes are identical to or at least parallel to and as close as possible to the optical axis of the reflector. The optical entry or exit surfaces of the transmitting and receiving channels can be formed so as to have a planar transition to the reflector surface so that a cohesive surface or a common entry surface is formed. Transmitting and receiving channels are thus integrated together with the reflector functionality into a—at least partly common—optical aperture so that cohesive aperture, i.e. in the form of a connected aperture or common aperture, follows.

It is particularly advantageous if direct integration of the entry or exit surfaces into the surface otherwise used for reflection is effected. The emitting and receiving channels then define the optical paths connected to the target object from the entry surface to the respective electro-optical component, i.e. transmitter or receiver. The channel may have additional deflecting elements, filters or similar components.

The optical apertures for the transmitting or receiving channel can be arranged either at the edge of the reflector surface or in a zone used in the prior art as a reflector region or in the reflector surface itself. The first approach has advantages with regard to a modular design which therefore supports the possibility of retrofitting. The second approach permits a particularly close spatial arrangement of the various axes for reflector, transmitter and receiver.

Regarding the target objects generally used for geodetic applications, it is possible to identify two generic basic types, for which corresponding integration can also be realised.

A first embodiment is the 360° reflector which should be useable in principle independently of a prior orientation. This embodiment is generally composed of a plurality of retroreflectors which as a rule are in the form of triangular prisms and can be ground in an edge zone of the triangular reflector surface without substantially reducing the optically effective entry aperture. The transmitting and receiving apertures of the transceiver or of the transmitting and receiving channels can be positioned at the ground point. The edge zone should also be as close as possible to the optical centre of the retroreflector. Because the triangular prisms are oriented with their triple corners towards one another, there is generally little space for integration of the transceiver components in the centre of the body defined by the reflector surfaces. These components can therefore be arranged either at the top and/or bottom in the interior of the body or outside the region of the reflecting surface, the connection to the transmitting and receiving apertures being effected by corresponding beam-guiding elements of the transmitting and receiving channels.

A second embodiment relates to a simply directed retroreflector having a preferably triangular entry surface so that edges which are as long as possible result thereby. For producing a transmitter aperture, the centrally located triple corner is ground; for producing a receiving aperture, at least one of the edges is made transparent, for example by polishing away the reflective layer so that an aperture forms, it being possible to mount additional light-conducting components.

In the case of these compact embodiments, morphologically integrated in a housing, the various axes are close together so that sighting of the reflector and emission of the data-transmitting radiation by the measuring unit as well as the detection of the data-transmitting radiation emitted by the target object can be realised by a common optical system or by optical systems arranged structurally close together.

For the transmission of data by the central measuring unit, for example, the laser beam in any case used for distance measurement can be additionally modulated or a further laser beam is coupled into the identical beam path so that measurement and data transmission take place optically with the same axis. Since the optical receiving aperture and the reflector are morphologically integrated at the target object, the radiation is received partly for data evaluation as well as being sent back in a defined manner for the purpose of distance measurement by the measuring unit. Data transmission to the target object or the initialization of a response by the target object can, however, be effected not only by the radiation used for surveying itself but also by radiation which is used for other purposes, for example for automatic target searching or target recognition.

Along the same axis or at least close to this axis, radiation is emitted from the transmitter of the target object. Said radiation can then be received, for example, by the objective of a total station and can be evaluated by components also present for other purposes, such as, for example, for target searching or target recognition.

As a result of the structural integration, increased compactness and robustness of the design of the target object as well as of the central measuring unit are thus achieved. In addition, components present in the measuring unit can also be used for data transmission.

Owing to the small distance from transmitter and receiver to the reflector axis, the divergences of the transmitting units as well as the fields of view of the receiving units of target object and central measuring unit can be kept small and both the signal robustness and the range improve thereby. The probability of transmission errors is considerably reduced in both directions by the structural integration, in particular by the parallelism of the two sensor axes in the target object.

Although the effective reflector aperture is slightly reduced by the structural positioning of transmitter aperture and receiving aperture within said reflector aperture, the irradiance and hence the signal robustness can be considerably increased in comparison with the prior art via the now accessible small divergences of the measuring beam of the central measuring unit.

In addition, for example, the following previously manually achieved objects can be performed automatically in the surveying process:
1. Support of the target search process: After the initial sighting of an assumed target object, the target object transmits the target identification to the central station after the measuring radiation has been received; this may be, for example, the reflector number or the reflector type. The central station can then configure itself optimally for the target object sought, for example can use the suitable distance measuring program, for example for reflectorless measurements or for those with a reflector.
2. Transmission of the target object parameters, such as, for example, target height or the addition constant for the distance measurement.
3. Tilt monitoring at the plumb rod.
4. Tilt transmission from the plumb rod to the central station and correction of the derived coordinates.
5. Transmission of the point number in the case of repeated sighting of the same reflector.
6. Configurability of the parameters to be transmitted, for example a selection from the parameters or the choice of a data format to be used.
7. Transmission of meteorological data, such as temperature, humidity and atmospheric pressure.

The functions supporting the measuring process facilitate the work in a very wide range of applications, such as, for example, in
  applications for 2-man surveying tasks with plumb rod support,
  monitoring of fixed target objects, for example for monitoring structures,
  automated one-man surveying tasks in which a person operates the entire system from the plumb rod,
  target searching and target identification at night. The transmitting unit of the target object then optionally also lights up with a visible radiation.

If the target object is additionally formed with a receiver for a satellite-based positioning system, such as, for example, GPS, GLONASS or Galileo, appropriate data for such a position system can be transmitted from the target object. An advantageous potential use also consists in the integration of such a target object into a network comprising receivers which can also be used, for example, as reference stations for a differential system.

The target object according to the invention and a modular component according to the invention are described in more detail below, purely by way of example, with reference to working examples shown schematically in the drawing. Specifically, FIG. 1 shows the diagram of a surveying system with a target object according to the prior art;

FIG. 2 shows the diagram of a surveying system with target objects according to the prior art and the functionality to be achieved according to the invention;

FIG. 3a-b show the diagram of an all-round reflector according to the prior art and a first working example of a target object according to the prior art;

FIG. 4 shows the diagram of the compact geometrical relationships of the first working example;

Figure 9:
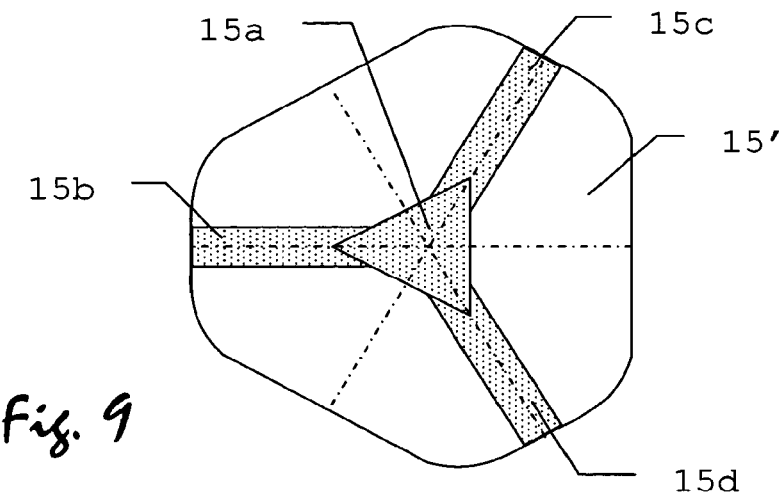
Figure 10:
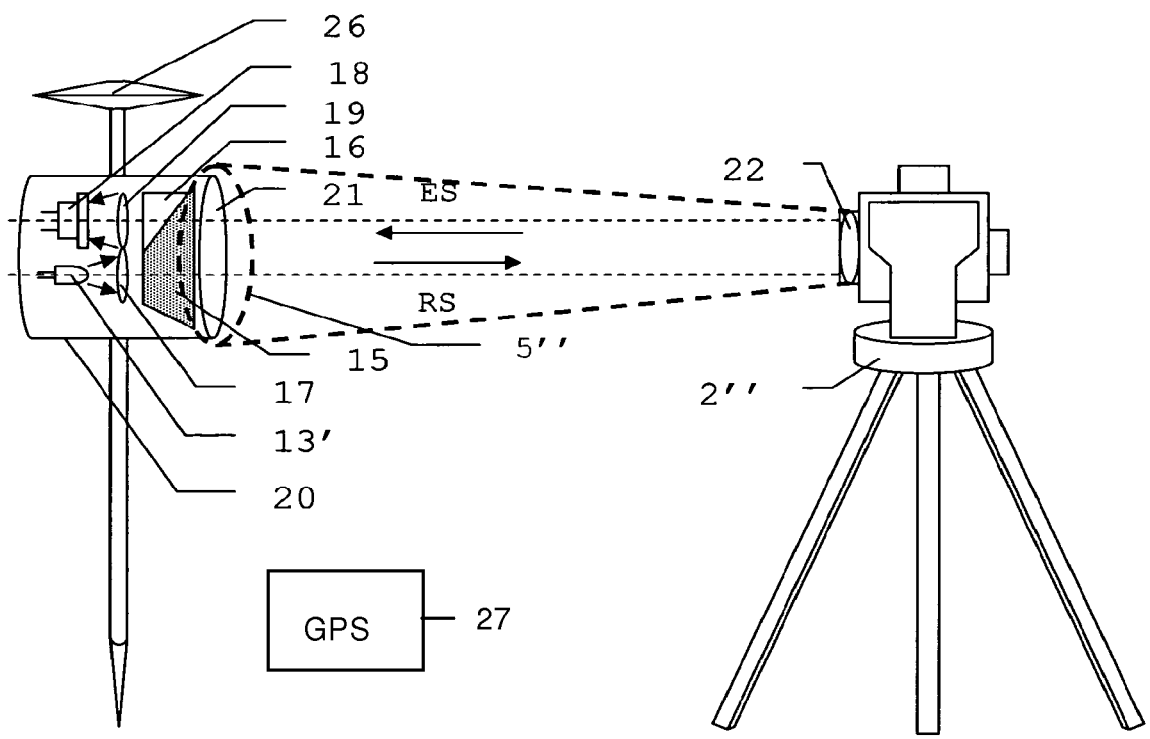
Figure 11:
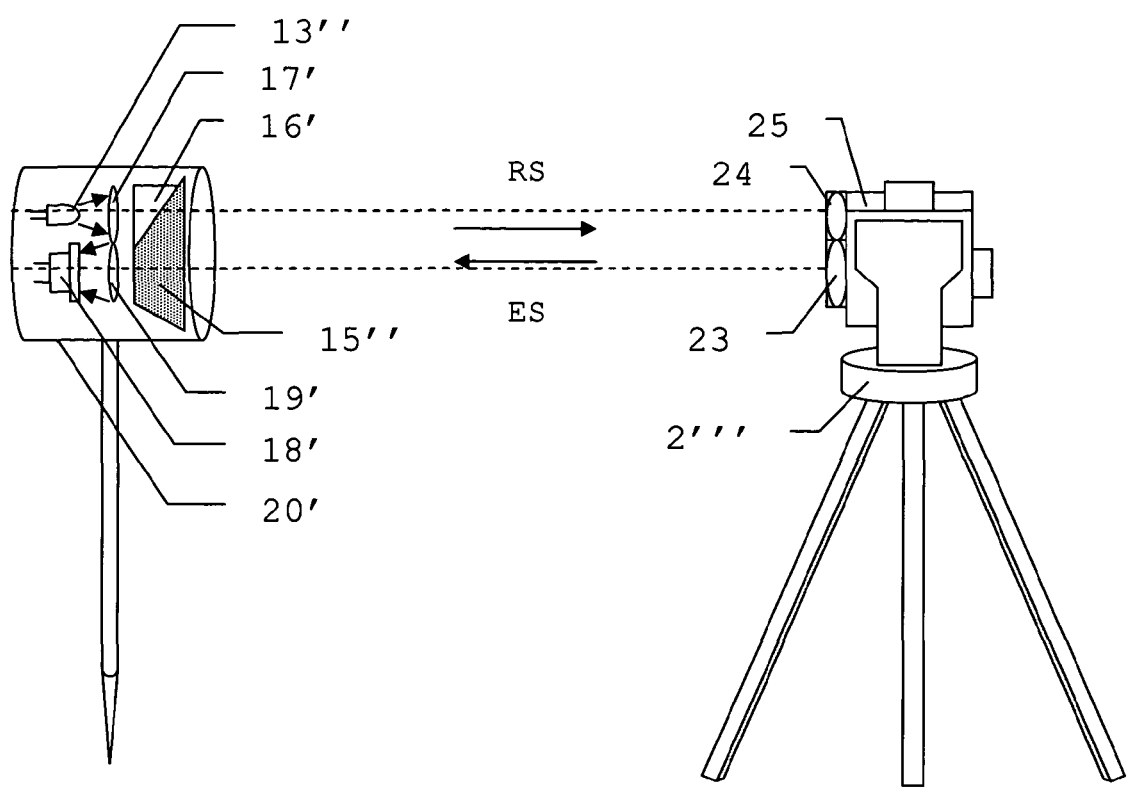

FIG. 7a-c show the diagram of a simple retroreflector as a second working example of the target object according to the invention;

FIG. 8 shows the diagram of the reflector surface of the second working example with optical transmitting and receiving aperture;

FIG. 9 shows the diagram of the reflector surface of a third working example with optical transmitting and receiving aperture;

FIG. 10 shows the diagram of a system comprising target object according to the invention and a measuring unit having a common transmitting and receiving optical system and FIG. 11 shows the diagram of a system comprising a target object according to the invention and a measuring unit having parallel transmitting and receiving optical systems.

Figure 1:
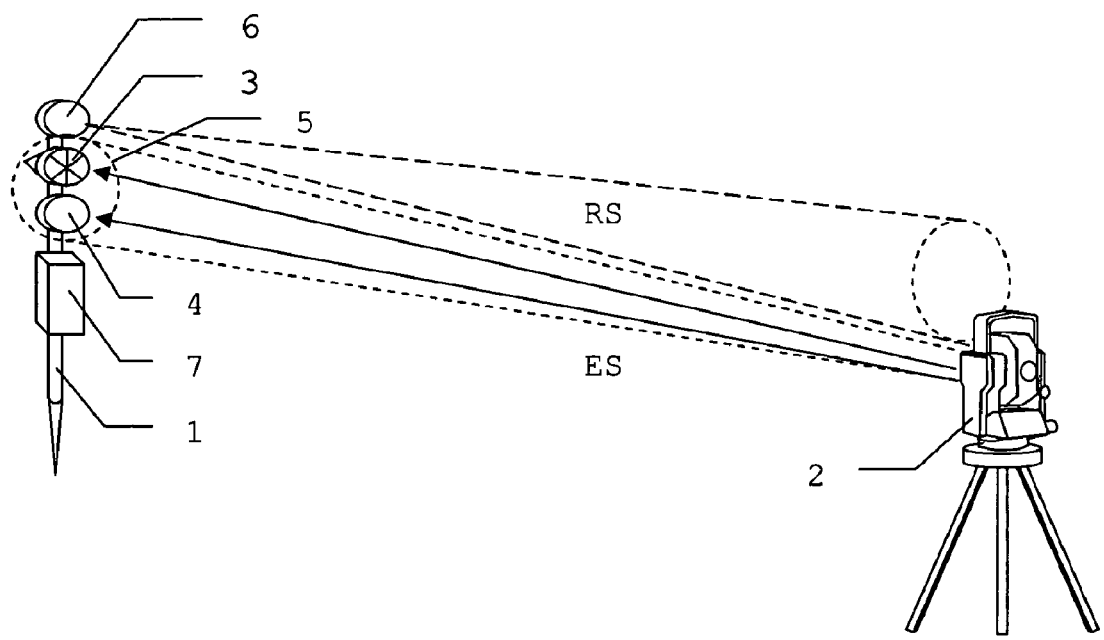

FIG. 1 shows a surveying system comprising a target object according to the prior art and a central measuring unit 2. The target object consists of a plumb rod 1 on which a reflector 3, a receiver 4 for the radiation ES emitted by the measuring unit 2 and a transmitter 6 for transmitting back-emitted radiation RS are arranged. For controlling the separate components, a likewise separate operation and control unit 7 can be used. The emitted radiation ES has a beam cross-section 5 which, in the case of relatively large distances, covers both reflector 3 and receiver 4 and thus permits simultaneous data transmission and measurement. However, this adequate coverage of the two components becomes increasingly poor at close range and may also be completely absent, so that, below a threshold distance, either no measurement or no data transmission to the target object can take place. In addition, the transmitter 6 must emit the back-emitted radiation RS with a divergence which ensures reliable acquisition by receiving components of the measuring unit 2.

Problems therefore also occur in the case of medium to greater distances since the signal rapidly becomes weaker owing to the necessarily large beam divergence and hence large beam cross-section 5, and the poor signal/noise ratio prevents a measurement or a data transmission to the target object or back to the measuring unit 2. The critical distances are all shorter than is typical in the case of the geodetic requirements.

In the case of tilting of the plumb rod 1, the problem may arise that the components which are arranged with their axes one on top of the other and with which in each case corresponding components of measuring unit 2 are coordinated lie outside the beam cross-section 5 or the acquisition region of the receiver of the measuring unit 2. In order to ensure coverage of all axes a perpendicular orientation and precise alignment must be maintained for the measurement.

In addition, the various components have the problem of mutual adjustment and alignment, of poor mechanical robustness and of comparatively high weight. In addition a common power supply of transmitter 6 and receiver 4 is complicated and susceptible to faults.

Figure 2:
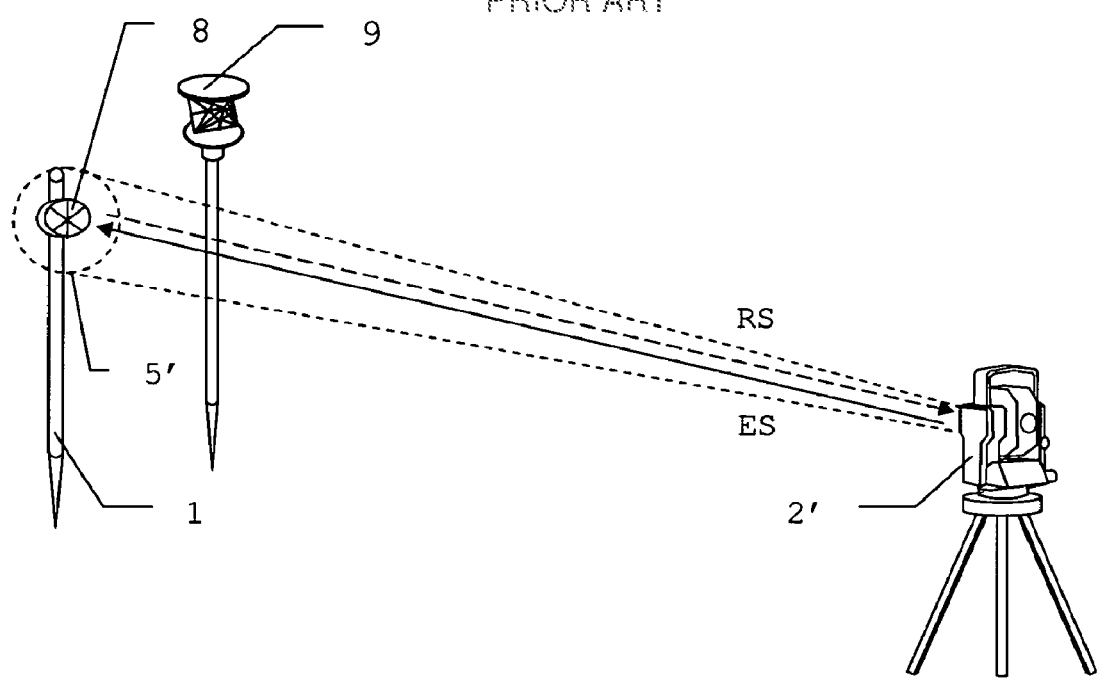

FIG. 2 shows a surveying system comprising target objects according to the prior art and the functionality to be achieved according to the invention. A first generic geodetic target object is a simple retroreflector 8 on a plumb rod 1. A second generic geodetic target object is an all-round reflector 9 which is composed of individual retroreflector components and covers a range of 360°. The functionality strived for lies in the integration of all lines of sight or radiation axes required for data transmission and surveying within the beam cross-section 5' which is used for surveying and is dimensioned with a typical divergence of 0.5 mrad to 2 mrad. The receiver and transmitter axes are positioned close to the target axis used for surveying, so that, on the one hand receiver and reflector are illuminated with the emitted radiation ES from the measuring unit 2' even in the case of short distances and, on the other hand, the radiation RS emitted back by the transmitter is within the field of view of the measuring unit 2'.

An all-round reflector as target object is shown in FIG. 3a-b. There, the embodiment of FIG. 3a corresponds to a first all-round reflector 9 of the prior art, whereas FIG. 3b shows a second all-round reflector 9' as a target object according to the invention. In this specially shown case, the first all-round reflector 9 has six retroreflectors 10 with a triangular reflector surface, which are joined to one another so that their reflector surfaces together cover a polar angle of 360°. Below, the retroreflectors 10 having a triangular reflector surface are referred to as triangular prisms or triple prisms for short. In addition to triangular or triple prisms, other forms, such as, for example, concave reflectors, can also be used according to the invention.

The second all-round reflector 9' likewise has six triangular prisms 10' with a polar angle of 360°, zones 11' forming recesses in the lateral lines of the reflector surfaces, into which zones the transmitting and receiving apertures are integrated according to the invention in a compact manner and close to the target axis used for surveying. In principle, target objects according to the invention which cover a smaller polar angle, e.g. 120° with only two retroreflectors or 180° with 3 retroreflectors, can of course also be realised. This is possible, for example, when a reflector is used by a plurality of measuring units at different angles. Such configurations can occur, for example, in the monitoring of structures. The optical transmitting and receiving apertures thus use parts of the reflector surfaces or triangular prisms 10' which are usually used for reflection of the measuring radiation and are therefore also covered—at least partly—by the beam cross-section of the emitted radiation. The zones 11' used by transmitting and receiving apertures are thus integrated into the original reflecting surface and are directly adjacent to the reflector surface remaining after the modification, a common outer surface being formed. By means of this development, in particular a robust and dust- or water-protected embodiment suitable for field use can be realised.

FIG. 4 shows the diagram of the geometrical relationships in the case of a first working example of the target object according to the invention. In order to be able to integrate the transmitting and receiving components, a lateral edge is removed at the reflector surface of the triangular prism 10' so that a useable zone 11' forms. For example, a cap 12 which may also be in the form of a modular component for the retrofitting of all-round reflectors of the prior art is positioned in this zone 11'. The cap contains the transmitting and receiving components or at least the optical apertures and suitable optical reflecting elements. In this embodiment, the cap has, for each coordinated reflector surface, at least one transmitting component and at least one receiving component, of which a light emitting diode (LED) is shown here purely by way of example as radiation source 13. Thus, the components used for communication are placed so that their axes are positioned close to the reflector axis RA, only minimal limitation of the reflector properties nevertheless occurring. This may be permitted by a choice of as small a distance A1 as possible between the axes of radiation source 12 or receiving components or the optical apertures and the lower boundary of the cap and as small a distance A2 as possible between reflector axis RA and the boundary formed by the distance of the lateral edge or the useable zone 11'. As a result of the values as small as possible for these distances A1 and A2, the axes of radiation source 13 or receiving components and the reflector axis RA are aligned so as to lie close together. In the present case, the reflector axis RA is defined by the connecting line between reflection centre RZ and measuring unit 2. Comparison with the mean radius of the entry or reflector surface is decisive as a measure of the closeness of the target object according to the invention. A close arrangement fulfils the condition that the distance from the receiving or transmitting components 13 to the axis RA is smaller than the mean radius of the reflector surface.

The only minimal limitation of the reflector properties is supported by the inclination of the triangular prism 10' through an angle $\alpha$ of, for example, about 20° relative to the perpendicular, since, relative to the measuring unit, the pupil of the reflector surface shifts optically downwards hereby and hence away from the cap 12. The triangular prism 10' has a base angle $\beta$ of, for example, about 35° relative to the outer surface directed towards the measuring unit.

Figure 5:
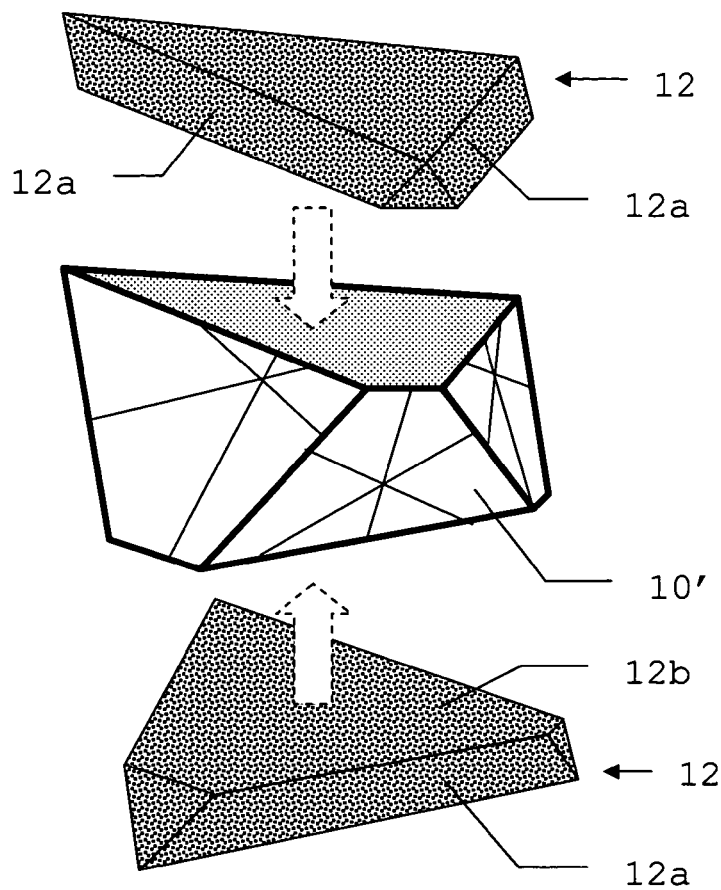
FIG. 5 shows the diagram of the use of modular components for realising the first working example.

In FIG. 5, the use of caps 12 as modular components for realising the first working example is explained. The triangular prisms 10' arranged with their base surfaces oriented relative to one another are each ground away at a vertex and at the base surface along a lateral edge adjacent to the entry surface so that two caps with the transmitting and receiving components can be mounted with their contact surfaces 12b on the bottom and top of the all-round reflector. According to the invention, the transmitting and receiving apertures should be formed as close as possible to this contact surface 12b so that, in the assembled state, an arrangement with the greatest possible closeness to the reflection centre follows. In principle, a change from triangular prism to modification according to the invention is not required since the caps 12 can also be mounted directly on the unmodified triangular prisms, as shown in FIG. 3a, since the condition: "distance from the receiving or transmitting components to the axis RA" is smaller than the "mean radius of the reflector surface" is also fulfilled in this case. According to the invention, the direct mounting, for example by adhesive bonding, of a transmitter/receiver line on partial regions of the triangular prism is also possible as a further alternative. With the availability of thin sheet-like materials, lines of receiver and transmitter diodes can also be mounted directly on the surface which is otherwise not modified or only slightly modified.

Figure 6:
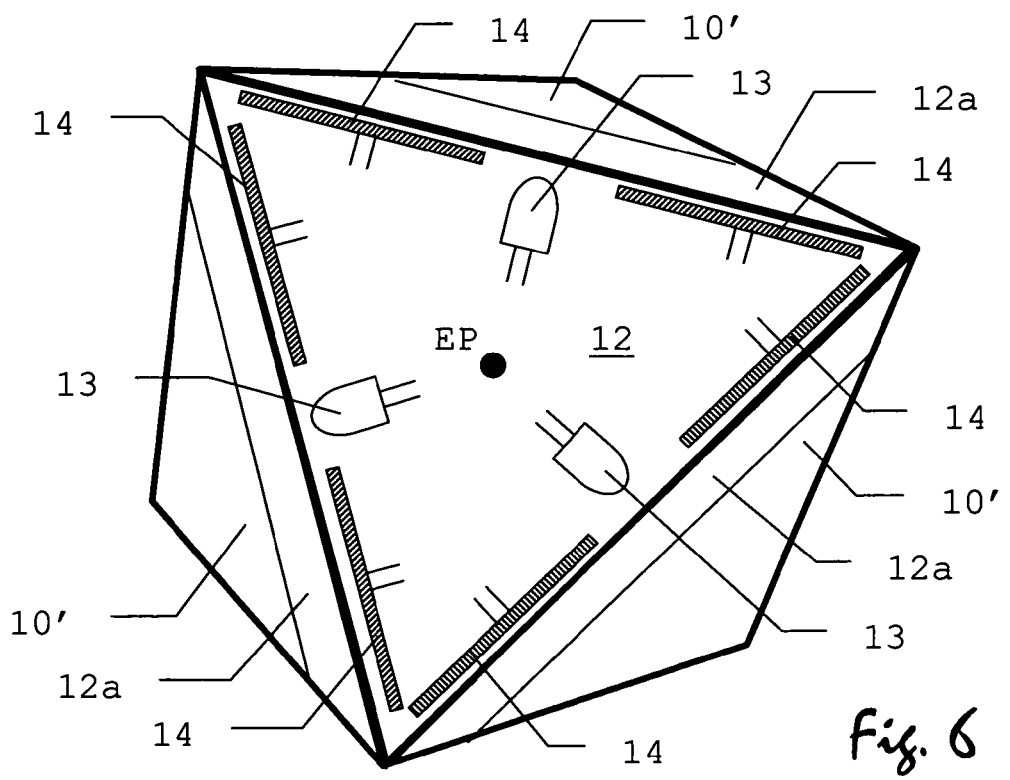
FIG. 6 shows the diagram of the transceiver components of the first working example from a bird's eye view.

FIG. 6 illustrates the arrangement of the transmitting and receiving components of the first working example in the cap 12 with in each case 1 LED as radiation source 13 per reflector surface or triangular prism 10'. The view is now perpendicularly downwards or from a bird's eye view. According to the invention, two or more radiation sources 13 per triangular prism 10' can also preferably be realised; a divergence of the individual transmitters of only about 30° is therefore sufficient in order to be able to cover the total 360° range in the horizontal direction. The theoretical end point EP of the measuring paths is within the cap 12, in the centre thereof. In the vertical direction, there follows an active region of about 30°, which is sufficient for most geodetic applications. According to the invention, however, other opening angles and numbers of radiation sources 13 may also be used, for example 30 or 12 radiation sources with 12° and 30° opening angles. Suitable radiation or light sources are lasers or preferably LEDs in the red or infrared range. LEDs are subject to less stringent safety provisions and therefore more power can be emitted in the case of these radiation sources 13, so that the range increases compared with other spectral ranges.

In this working example, two detectors 14 for receiving the radiation emitted by the measuring unit are arranged on both sides of the radiation source 13. Both transmitting and receiving components point with their optical axes directly through the end face 12a of the cap 12 so that two receiving apertures and one transmitting aperture are realised per end face 12a. The end faces 12a thus represent the surfaces which are coordinated with a reflector surface and are oriented for measurement to the measuring unit. They may be produced from optically transparent materials or have corresponding designed regions. According to the invention, a working example comprising a single detector 14 in the centre of the end face and one radiation source 13 each on both sides can also be realised. Such a module is advantageous in particular for relatively large ranges.

The electronics for the transmitting and receiving components can be arranged in the interior of the cap 12. Under disadvantageous spatial circumstances, beam-guiding elements can also be used instead of radiation sources 13 and detectors 14, so that the actual transmitting and receiving components can be arranged elsewhere, for example a greater distance away from the triangular prism 10'. In this case too, however, the advantageous positioning according to the invention of the optical modular axes close to the axis RA is retained.

FIG. 7a-c show the diagram of a simply directed retroreflector as a second working example of the target object according to the invention with a receiving aperture 15b. For designing the transmitting and receiving channels, the triple corner on the optical axis is removed in the case of a triangular prism 15 for forming a transmitting aperture 15a, and one of the mirror edges is ground away or polished away for forming the receiving aperture 15b. As shown in FIG. 7a, a radiation source 13 can then be mounted behind the transmitting aperture 15a and a glass prism 16 on the receiving aperture 15b, for example by cementing on, so that the optical effect is matched with that of a parallel plate. The strip-like receiving aperture 15b permits a compact design of the receiver unit with high light intensity and in particular close to the axis. The mirror edge which has been polished away serves as a support element for the receiving channel; on the other hand, the light transmission factor is increased by the longer edges in the case of triangular prisms in comparison with round prisms.

The assembled state is shown in FIG. 7b and in FIG. 7c. The back-emitted radiation RS is sent towards the measuring unit through the transmission aperture 15a. The closeness of the transmission axis to the reflector axis RA is optimal in this working example. The positioning of the axis of the receiving unit relative to the reflector axis RA is compact because it is present within the reflector surface, and the condition "distance from receiving or transmitting components to the axis RA" is smaller than the "mean radius of the reflector surface" is fulfilled. The radiation ES emitted by the measuring unit is passed, after reception, through the exit surface 16a of the glass prism 16 as an element of the receiving channel to the detector. Both a transmitting collimator and a receiving collimator can also be placed in the transmitting and receiving channel behind the modified retroreflector and, if required, can be adjusted parallel to one another as add-on modules.

FIG. 8 shows the reflector surface of the triangular prism 15 of the second working example. Viewed from the measuring unit, the optical transmitting aperture 15a and a receiving aperture 15b are recognisable in the reflector surface.

A modification of the reflector surface in the development of the receiving channel of a third working example as a triple prism with rounded corners is shown in FIG. 9. By polishing away three back edges of a retroreflector 15', three entry apertures 15b-d of a receiving channel are created. Three polished-away edges are advantageous particularly in the case of round prisms or reflectors having rounded corners of the entry surface since the effective detection surface is not reduced thereby compared with a triangular prism. In principle, these entry surfaces can, however, also be differently designed with regard to their function. In particular, one of these apertures can also be used as a further transmitting aperture. In principle, the functions of the four possible optical channels can therefore be freely chosen. If there is a need for a target plate in the centre of the retroreflector—since the optical cross which serves as a target plate for the geodesist up to 300 m is now in fact absent because the triple corner has been polished away—a mark may be attached or appropriately projected.

FIG. 10 illustrates the function of a system comprising target object according to the invention and a central measuring unit 2" having a common transmitting and receiving optical system 22. In a housing 20 of a target object according to the invention, a retroreflector, in particular a triangular prism 15 with a cemented-on glass prism 16 and at least two formed optical channels is arranged behind a cover 21 so that radiation ES emitted by the down-circuit radiation source 13' or the detector 18 can be received or back-emitted radiation RS can be emitted. For this purpose, a transmitting collimator 17 and a receiving collimator 19 are coordinated in each case with radiation source 13' and detector 14. Consequently, both the receiving aperture and the transmitting aperture are within the beam cross-section 5" of the emitted radiation ES or within the acquisition range of the transmitting and receiving optical system 22 of the measuring unit 2". If the target object according to the invention is equipped with a receiver 26 for a satellite-based positioning system 27, corresponding data can also be transmitted via the communication link. The position of the target object can be accurately determined by the central measuring unit 2" so that data, for example for differential GPS, can be transmitted from said measuring unit. Integration into a network of reference stations, which in turn may also once again be target objects according to the invention but also other types of receivers or stations, can advantageously be effected here. The formation according to the invention of target objects thus permits the use of a multiplicity of measured reference stations or reference points for obtaining correction data for the positioning system.

FIG. 11 shows a system comprising target object according to the invention and a measuring unit 2''' with measuring optical system 23 and receiving optical system 24 arranged in parallel, it also being possible to position the receiving optical system 24, for example, in a retrofittable cover 25 of the measuring unit 2'''. If the measuring unit 2''' is thus equipped with a biaxial receiver system, the edge arranged adjacent to the optical axis of the retroreflector is suitable as a transmitting channel. In this case, the receiver would have to be positioned in the centre of the retroreflector. The arrangement of transmitting and receiving channel is thus inverted, i.e. the components detector 18' and receiving collimator 19' are now arranged in the centre behind the ground-away triple corner of the retroreflector 15", in the housing 20' of the target object. The transmitting components radiation source 13", transmitting collimator 17' and a glass prism 16' are present optically in a beam path passed through an edge of the retroreflector 15", the closeness of the receiving unit to the reflection centre of the reflector and the closeness of the transmitter unit as a part of the reflector surface being obvious.

The figures show the surveying situations, target objects and measuring units purely schematically. In particular, no size relationships or details of the surveying are revealed by the diagrams. The target objects shown only by way of example also represent other types of structures used for surveying or the elements defining a point to be surveyed. References to retroreflectors/triangular prisms/triple prisms 10, 10', 15, 15', and 15" also refer to the related "reflecting surfaces" or "reflector surfaces", respectively.

The invention claimed is:

1. A geodetic target object comprising:
    at least one reflector with a reflector surface for receiving incident light received through an optically transmissive surface and for reflecting the incident light in substantially the opposite direction to that received back through the optically transmissive surface for measurement of a distance between the geodetic target object and a remote measurement unit;
    a receiving channel having a detector for receiving electromagnetic radiation through a surface of an endface disposed directly adjacent to the reflector;
    a data transmitting channel for communicating information encoded data from the geodetic target object to the remote measurement unit, the data transmitting channel having a radiation source configured to emit modulated and information encoded electromagnetic transmitted radiation through the surface of the endface and at an optical power level sufficient to provide communication of the information encoded data to the remote measuring unit, wherein the endface through which the receiving and transmitting channel communicate forms a cohesive aperture with the optically transmissive surface through which the reflector reflects the incident light; and
    electronics configured to control the transmission of the information encoded electromagnetic radiation by the radiation source.

2. A geodetic target object according to claim 1, wherein the reflector surface includes an optical retroreflector, and wherein the radiation source is configured to emit electromagnetic transmitted radiation in the visual or infrared range.

3. A geodetic target object according to claim 1, wherein the distance from the optically transmissive surface to a reflector axis is smaller than a mean radius of the reflector surface having a reflection center, the reflector axis being defined as a connecting line between the reflection center and a measuring unit.

4. A geodetic target object according to claim 1, wherein the reflector surface is part of a triple prism.

5. A geodetic target object according to claim 4, comprising at least two triple prisms.

6. A geodetic target object according to claim 5, comprising six triple prisms, the six triple prisms being formed and arranged so that a polar angle of 360° is covered by reflector surfaces.

7. A geodetic target object according to claim 5, wherein at least one radiation source and at least one detector are coordinated with each triple prism.

8. A geodetic target object according to claim 5, wherein at least one radiation source and two detectors are coordinated with each triple prism.

9. A geodetic target object according to claim 5, wherein at least two radiation sources are coordinated with each triple prism.

10. A geodetic target object according to claim 5, wherein the optically transmissive surface is arranged adjacent to one side of the at least two triple prisms.

11. A geodetic target object according to claim 10, wherein the at least one radiation source and the at least one detector are arranged in a modular housing.

12. A method for data transmission for determining the position of a geodetic target object, the geodetic target object having a reflector surface and a transmitted radiation source for producing transmitted radiation that is modulated for transmitting data to a geodetic measuring unit, the geodetic measuring unit including a measuring radiation source for producing measuring radiation that is used for determining a position of the geodetic target object, the method comprising the following acts:
    the measuring unit emitting the measuring radiation to the target object for determining the position of the target object, the measuring radiation being defined by a measuring beam axis and a measuring beam cross-section;
    the measuring unit receiving back-radiated measuring radiation reflected by a reflector of the target object;
    determining the position of the target object from the measuring radiation transmitted by the measuring unit and the back-radiated measuring radiation received by the measuring unit; and
    the geodetic target object including a radiation source and emitting the transmitted radiation to the measuring unit, the transmitted radiation being modulated to transmit information encoded data from the target object to the measuring unit over a data transmitting channel that extends through the reflector and to the measuring unit, wherein the reflector includes a common transmissive surface for receiving the measuring radiation therethrough and for transmitting the transmitted radiation therethrough, wherein the common transmissive surface of the reflector is arranged within an area of the measuring beam cross-section at the target object.

13. A method according to claim 12 performed in conjunction with a satellite-based positioning system, wherein data for said satellite based positioning system are transmitted or received by the geodetic target object.

14. A method according to claim 13, wherein the method is performed in a network and the geodetic target object is equipped with one or more receivers for such a satellite-based positioning system.

15. A geodetic target object comprising:
    at least one reflector with a reflector surface and a common optically transmissive surface for receiving incident light there through to the reflector surface, the reflector being configured to reflect the incident light in substantially the opposite direction to that received and back through the common optically transmissive surface; for measurement of a distance between the geodetic target object and a remote measurement unit
    a receiving channel having a detector for receiving electromagnetic radiation through the common optically transmissive surface;
    a data transmitting channel for communicating information encoded data from the geodetic target object to the remote measuring unit, the data transmitting channel having a radiation source configured to emit modulated and information encoded electromagnetic transmitted radiation through the common optically transmissive surface and at an optical power level sufficient to provide communication of the information encoded data to the remote measuring unit; and electronics configured to control the transmission of the information encoded electromagnetic radiation by the radiation source.

16. A geodetic target object according to claim 15, wherein the common optically transmissive surface is integrated with the reflector surface.

17. A geodetic target object according to claim 15, wherein the reflector surface is part of a triple prism.

18. A geodetic target object according to claim 17, wherein at least one edge of the triple prism is in the form of a receiving aperture.

19. A geodetic target object according to claim 18, wherein a prism for beam guidance is mounted on the at least one edge of the triple prism.

20. A geodetic target object according to claim 17, wherein the center of the triple prism is in the form of transmitting aperture as a result of a flattened triple corner.

21. A geodetic target object according to claim 17, wherein the center of the triple prism is in the form of a receiving aperture having at least one edge of the triple prism in the form of a transmitting aperture.

22. A geodetic target object according to claim 21, wherein a target plate is represented in the center of the triple prism by a projection.

23. A geodetic target object according to claim 22, wherein a transmitting collimator and/or receiving collimator is arranged behind the triple prism in a receiving direction.

* * * * *